W. F. FARNSWORTH.
RESILIENT TIRE.
APPLICATION FILED OCT. 3, 1918.
1,318,270.
Patented Oct. 7, 1919.
3 SHEETS—SHEET 1.
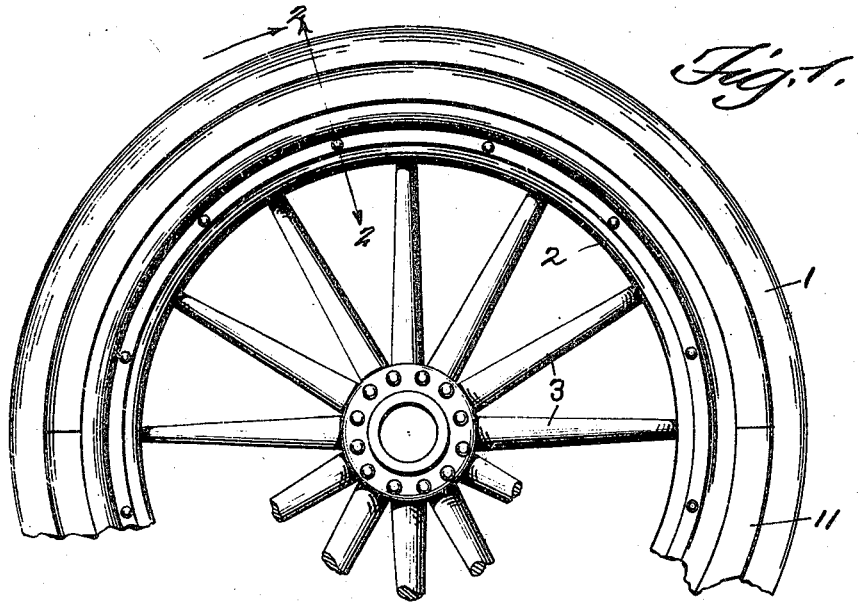
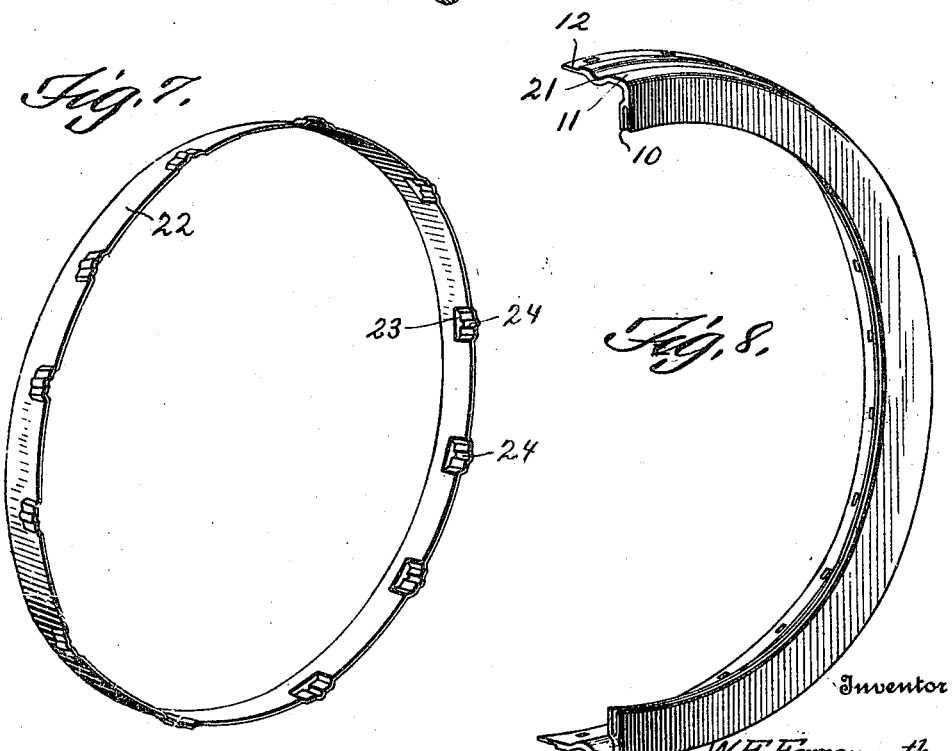

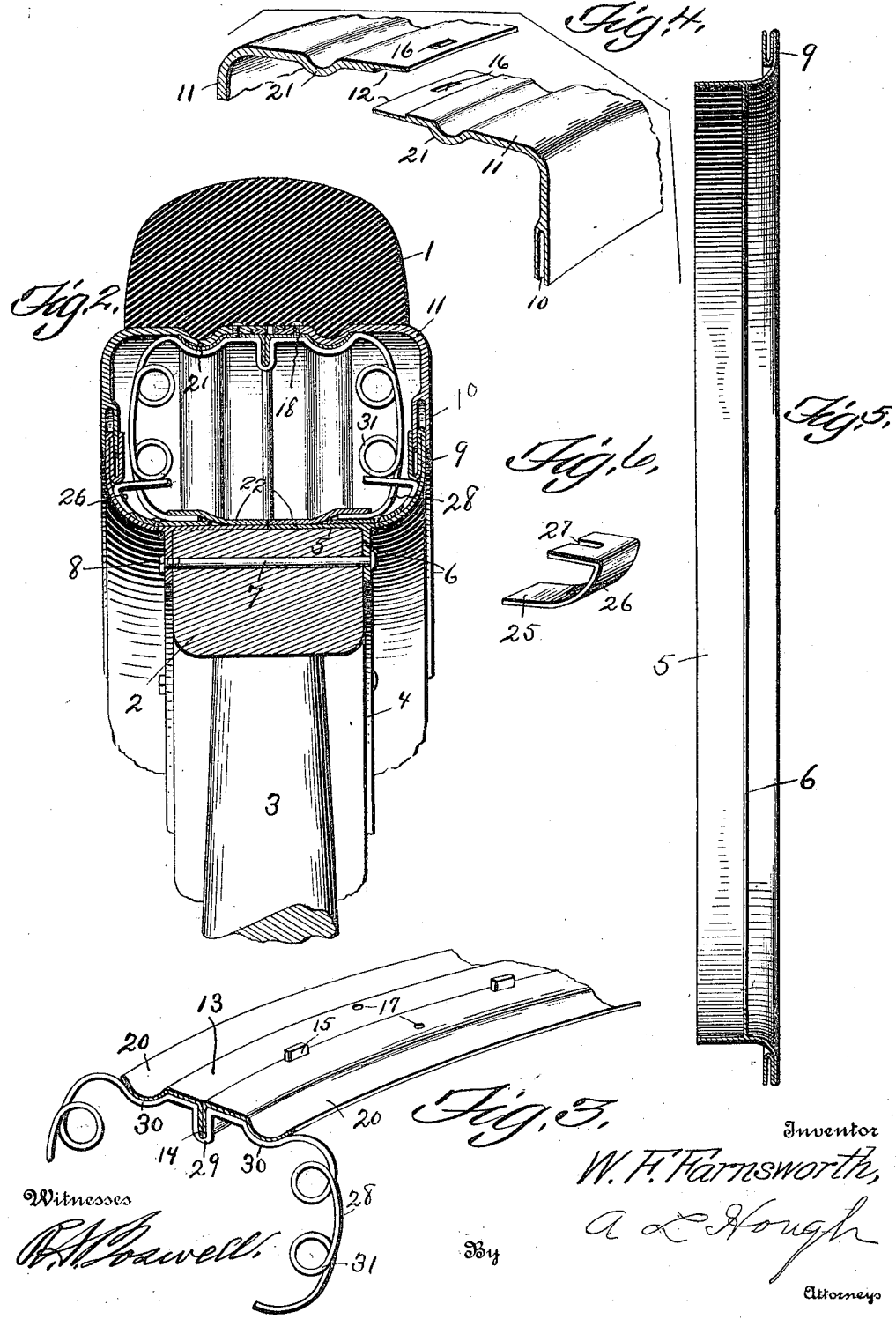

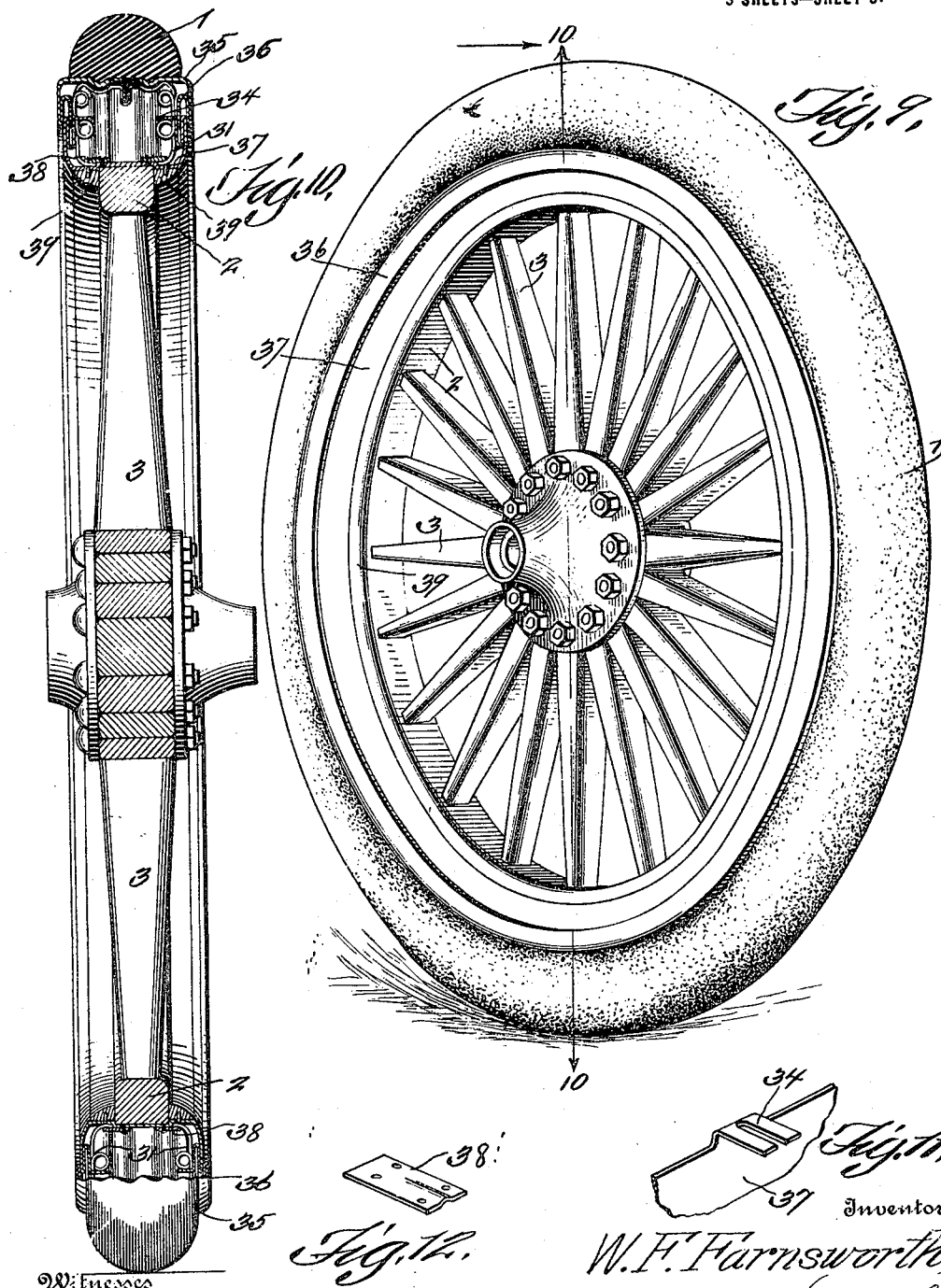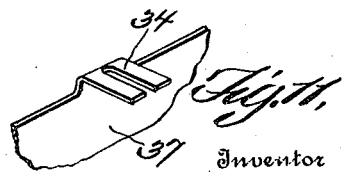

UNITED STATES PATENT OFFICE.

WILLIAM F. FARNSWORTH, OF WASHINGTON, DISTRICT OF COLUMBIA.

RESILIENT TIRE.

1,318,270.  Specification of Letters Patent.  Patented Oct. 7, 1919.

Application filed October 3, 1918. Serial No. 256,700.

*To all whom it may concern:*

Be it known that I, WILLIAM F. FARNSWORTH, a citizen of the United States, residing at Washington, in the District of Columbia, have invented certain new and useful Improvements in Resilient Tires, of which the following is a specification, reference being had therein to the accompanying drawing.

This invention relates to new and useful improvements in resilient tires for wheels, and comprises a simple and efficient device of this nature having various details of construction, combination and arrangement of parts which will be hereinafter fully described, shown in the accompanying drawings and then specifically defined in the appended claims.

I illustrate my invention in the accompanying drawings which, with the numerals of reference marked thereon, form a part of this application and in which:

Figure 1 is a side elevation showing the application of my tire to a wheel.

Fig. 2 is a sectional view on line 2—2 of Fig. 1.

Fig. 3 is an enlarged detailed perspective view of a part of the invention.

Fig. 4 is a sectional perspective view.

Fig. 5 is an edge view of a band section.

Fig. 6 is a detailed perspective of a spring holding member.

Fig. 7 is a detailed perspective of a spring engaging band, and

Fig. 8 is a perspective view of one of the interlocking band sections.

Fig. 9 is a perspective view of a slightly modified form of the invention.

Fig. 10 is a sectional view on line 10—10 of Fig. 9, and

Figs. 11 and 12 are details of parts of the invention.

Reference now being had to the details of the drawings by numerals:

1 designates a solid tire preferably of rubber, and 2 the felly of a wheel fastened to the spokes 3. Semi-circular felly engaging bands 4, a detail of one of which is shown in Fig. 5 of the drawings, have right angled flange portions 5 and 6, the former of which engages the felly in the manner shown in Fig. 2 of the drawings, covering one-half of the surface thereof, while the flange 6 engages the side of the felly and provided with apertures for the reception of the bolts 7, upon the threaded ends of which nuts 8 are mounted. The outer flaring portion of each band 5 is bent upon itself forming the U-shaped portion 9, as shown in Figs. 2 and 5 of the drawings, and which is adapted to interlock with the recessed edge 10 of the semi-circular band section 11. The two complemental sections 11 upon either side have overlapping portions 12, shown clearly in Figs. 2 and 4 of the drawings, which when adjusted in place, are held to a circular hoop 13, a detailed portion of which is shown in Fig. 3 of the drawings, and which has a central longitudinal portion bent upon itself forming a ridge 14. Said hoop has angular outlined lugs 15 which are adapted to engage similar outlined openings 16 formed in the overlapping portions of the band sections 11, as shown in Fig. 4. Apertures 17 having threaded walls are also formed in the hoop, and which are adapted to receive screws 18 passed through apertures in the band sections 11. Said hoop is provided with a circumferential groove 20 adapted to receive annular ribs 21 formed in the sections 11.

The tire, it will be noted, is sprung into the grooves formed in the sections 11 by the formation of the annular ribs 21, thus serving to hold the tire in place.

22 designates two complemental band sections, one of which is shown in Fig. 7 of the drawings, secured to the felly by riveting or other suitable means, said sections being provided with a series of recesses 23 in one edge thereof spaced apart, and each recess has a central groove 24 formed in the bottom thereof, the recesses 23 being adapted to engage one end 25 of a plate 26, a detail of which is shown in Fig. 6 of the drawings, and which plate has in its upper inwardly turned portion a slot 27 adapted to receive one end of the spring 28, as shown in Fig. 2 of the drawings. Said spring 28, there being one for each recess in the band 22, is bent upon itself at its longitudinal center to form a U-shaped portion 29 adapted to fit over the portion of the hoop 13, which is bent upon itself as at 14, and each arm of the spring has a concaved portion 30 adapted to receive the convexed portion of the hoop 13. The inner coil 31 upon each arm of the resilient spring is adapted to rest against the plate 26, while the adjacent end of the spring passes through the slot 27 and is adapted to engage the groove 24 shown in Fig. 7 of the drawings.

After the parts are assembled in the manner shown in Fig. 2 of the drawings, it will be noted that the two semi-circular band sections 11, which interlock with the band 6, will have a play to compensate for the expansion and contraction of the springs under weight upon the tire, the springs being adapted to absorb vibrations, as will be readily understood.

In Figs. 9 to 12 inclusive I have shown a slight modification of my invention and in which the band 35 has a portion 36 bent upon itself and which receives a bent portion of the band 37 which latter has an inwardly extending portion, as at 34, as shown clearly in Fig. 11 of the drawings designed to receive the springs 31. In this modified form, it will be noted that the band 37 has a horizontally disposed felly engaging portion, which has an offset adapted to spring over the circumference of the felly. Plates 38, a detail of one of which is shown in Fig. 12 each has a groove formed therein to receive the end of a spring 31. Bands 39, with their outer surfaces formed on the arc of a circle, are fastened by screws to the band 37 on either side of the offset portion thereof.

What I claim to be new is:

1. A resilient wheel, comprising in combination with a felly, hoops about the periphery thereof and provided with recesses formed in the inner faces thereof, each recess having an indenture in its wall, a circular band surrounding and spaced apart from the hoops, springs bearing against the latter and having ends engaging said recesses, plates holding the ends of the springs in the indentures of the recesses and being slotted to receive the springs.

2. A resilient wheel, comprising in combination with a felly, hoops about the periphery thereof and provided with recesses formed in the inner faces thereof, each recess having an indenture in its wall, a circular band bent upon itself centrally and longitudinally forming a rib surrounding and spaced apart from the hoops, springs bent U-shaped at their longitudinal centers engaging over said rib, the ends of the springs engaging said recesses, plates seated in said recesses and holding the ends of the springs in the indentures formed in the walls thereof, said plates having inwardly projecting slotted ends to receive the springs.

3. A resilient wheel, comprising in combination with a felly, hoops about the periphery thereof and provided with recesses formed in the inner faces thereof, each recess having an indenture in its wall, a circular band bent upon itself centrally and longitudinally forming a rib surrounding and spaced apart from the hoops, lugs projecting from the outer face of said band, tire bands slotted to receive said lugs, springs bent at their longitudinal centers to form U-shaped portions engaged over said rib, the ends of the springs seated in the indentures of said recesses, plates holding the ends of the springs in the indentures and having inwardly extending slotted ends for the reception of the springs.

In testimony whereof I hereunto affix my signature.

WILLIAM F. FARNSWORTH.

Copies of this patent may be obtained for five cents each, by addressing the "Commissioner of Patents, Washington, D. C."